United States Patent
Filippi et al.

(10) Patent No.: US 6,610,259 B1
(45) Date of Patent: Aug. 26, 2003

(54) HIGH EFFICIENCY CATALYTIC CARBON MONOXIDE CONVERSION PROCESS

(75) Inventors: Ermanno Filippi, Castagnola (CH); Gianfranco Bedetti, Milan (IT)

(73) Assignee: Ammonia Casale S.A., Lugano-Besso (CH)

( * ) Notice: Subject to any disclaimer, the term of this patent is extended or adjusted under 35 U.S.C. 154(b) by 0 days.

(21) Appl. No.: 09/422,467

(22) Filed: Oct. 21, 1999

Related U.S. Application Data

(62) Division of application No. 08/985,277, filed on Dec. 4, 1997, now Pat. No. 5,985,231.

(30) Foreign Application Priority Data

Dec. 5, 1996 (EP) .............................................. 96203447

(51) Int. Cl.⁷ .............................. B01J 8/04; B01J 8/00; B01J 35/02; C10G 35/00; C01B 31/20
(52) U.S. Cl. .................. 422/220; 422/176; 422/181; 422/187; 422/192; 208/146; 423/437.2
(58) Field of Search ................ 422/220, 176, 422/112, 181, 187, 192; 208/146; 423/437.2

(56) References Cited

U.S. PATENT DOCUMENTS

4,140,625 A   2/1979 Jensen ........................ 208/146
4,234,314 A * 11/1980 Jones ........................ 208/146

FOREIGN PATENT DOCUMENTS

EP   0 372 453 A    6/1990
EP   0846653      * 10/1998
GB   1 085 613 A   10/1967

* cited by examiner

*Primary Examiner*—Glenn Caldarola
*Assistant Examiner*—Douglas W Rudnick
(74) *Attorney, Agent, or Firm*—Sughrue Mion, PLLC

(57) ABSTRACT

A process for high-efficiency catalytic conversion of carbon monoxide (CO) to carbon dioxide ($CO_2$) of the type comprising the steps of feeding at predetermined speed a gaseous flow comprising carbon monoxide to a reaction space (3) and reacting in the reaction space (3) said carbon monoxide to obtain a gaseous flow comprising carbon dioxide is distinguished by the preliminary step of accelerating said gaseous flow comprising carbon monoxide upstream of said reaction space (3).

13 Claims, 1 Drawing Sheet

HIGH EFFICIENCY CATALYTIC CARBON MONOXIDE CONVERSION PROCESS

The present invention is a division of U.S. application Ser. No. 08/985,277 filed Dec. 4, 1997, now U.S. Pat. No. 5,985,231 granted Nov. 16, 1999.

BACKGROUND OF THE INVENTION

1. Field of Application

The present invention relates to a process for high-efficiency catalytic conversion of carbon monoxide (CO) to carbon dioxide ($CO_2$) of the type comprising the steps of:

feeding at predetermined speed a gaseous flow comprising carbon monoxide to a reaction space;

reacting the carbon monoxide in this space to obtain a gaseous flow comprising carbon dioxide.

In the description given below and in the following claims, the term: "reaction space", is understood generally to mean a space comprising catalyst-containing means in which takes place the conversion reaction of carbon monoxide to carbon dioxide in accordance with the following formula.

$$CO+H_2O(steam) \leftrightarrows CO_2+H_2$$

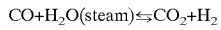

Carbon monoxide conversion reaction is very important to industry because it permits obtaining one of the basic reagents for many synthesis reactions (for example ammonia synthesis), i.e. hydrogen ($H_2$).

The present invention also relates respectively to a reactor and an equipment for implementation of the above process, so as to a modernization method respectively for a reactor and an apparatus for catalytic carbon monoxide conversion.

As known, in the field of catalytic carbon monoxide conversion the need is ever more strongly felt to provide easily implemented conversion processes, allowing achievement of ever higher production capacities at low operating and investment costs and low energy consumption.

2. Prior Art

To meet this requirement there have been proposed in the industry carbon monoxide conversion processes in which gaseous reagents were made to flow with substantially axial, radial or axial-radial motion across a reaction space comprising at least one catalytic bed.

A process of this type is described for example in EP-A-0 372 453.

Although advantageous in some ways, the processes according to the prior art all display a serious drawback linked to the presence of water—e.g. in the form of drops—entrained in the gaseous flow comprising carbon monoxide.

Indeed, water introduced together with the carbon monoxide into the reaction space irreversibly damages the surface layer of the catalyst contained therein and makes it extremely compact or packed.

This is due in particular to the localized thermal shock caused by the immediate evaporation of the water in contact with the high temperature catalyst, and in part to the mechanical impact of the water striking the catalyst.

The primary consequence of this packing of the surface layer of the catalyst is a significant pressure drop of the gaseous flow crossing the catalytic mass and a decrease in the activity of the catalyst, with associated decrease in conversion yield (and hence of productive capacity) and high energy consumption.

This important drawback of the carbon monoxide conversion processes according to the prior art has now been known for more than two decades, and the only solution proposed until now consists of manual elimination by a worker of the packed catalyst layer and its replacement with new catalyst.

In addition, formation of the packed catalyst layer can be so frequent and penalizing for the general behaviour of the process as to require the above mentioned treatment at very short time intervals generally less than a year (3 to 9 months).

As may be readily imagined, the present solution to the above mentioned drawback cannot be considered satisfactory for industry requirements because it involves stopping the plant assigned to implementation of the conversion process, and consequently stopping of production, high maintenance and operating costs and high energy consumption.

SUMMARY OF THE INVENTION

The problem underlying the present invention is to provide a carbon monoxide conversion process which would permit obtaining high production capacities and whose implementation would not involve high operating and investment costs nor high maintenance costs and energy consumption.

In particular, the problem underlying the present invention is to make available a carbon monoxide conversion process in which surface packing of the catalyst does not occur as it does in the processes according to the prior art.

The above mentioned problem is solved according to the present invention by a carbon monoxide conversion process of the above mentioned type, which is characterized in that it comprises the preliminary step of:

accelerating the gaseous flow comprising carbon monoxide upstream of the reaction space.

Advantageously, thanks to the step of accelerating the gaseous flow comprising carbon monoxide to be inlet to the reaction space, it is possible to obtain splitting of the water entrained therein in small diameter drops, e.g. between 100 $\mu m$ and 600 $\mu m$, so as to promote at least partial evaporation of the latter in the feed gaseous flow which is generally not saturated with steam.

In addition, it was surprisingly found that following the acceleration step, the water drops resulting from the splitting all tend to concentrate—for fluid mechanics reasons—towards the centre of the feed gaseous flow so as to strike only a small circumscribed portion of the catalytic mass contained in the reaction space, while drastically limiting pressure drops due to catalyst packing.

Lastly, as a consequence of the above mentioned splitting of the water in small diameter drops, any damage to the catalyst by mechanical impact is substantially eliminated.

Thus, the process according to the present invention permits advantageously on the one hand at least partial elimination of the water entrained in the feed gaseous flow, and on the other hand drastic reduction of the catalyst portion struck by this entrainment as well as its damaging effect.

Preferably, the above mentioned acceleration is such as to increase the speed of the gaseous flow comprising carbon monoxide by a factor between 1.5 and 5 times, so as to obtain effective and complete splitting of all the water entrained in the gaseous flow.

Advantageously, the gaseous flow comprising carbon monoxide passes through the reaction space with substantially radial or axial/radial motion.

In this manner, the presence of water traces in the feed gaseous flow does not cause particular packing problems and hence pressure drop, since the portion of the reaction space struck by this residual entrainment is quite secondary and marginal.

For implementation of the above mentioned process, the present invention makes available a reactor for high efficiency catalytic conversion of carbon monoxide to carbon dioxide of the type comprising:

a substantially cylindrical external' shell;
at least one catalytic bed supported inside the above mentioned shell;
an inlet nozzle in fluid communication with the above mentioned shell to feed to said at least one catalytic bed a gaseous flow comprising carbon monoxide;
characterized in that it further comprises:
means for accelerating the gaseous flow supported upstream of the at least one catalytic bed.

As an alternative, the present invention is advantageously implemented by an equipment for high-efficiency catalytic conversion of carbon monoxide to carbon dioxide of the type comprising:

a conversion reactor comprising a substantially cylindrical shell and at least one catalytic bed supported in this shell;
a duct for feeding to the reactor the gaseous flow comprising carbon monoxide;
and characterized in that it further comprises:
means for accelerating the gaseous flow supported in the duct.

In accordance with another aspect of the present invention, there is also made available a method for modernization of a reactor for catalytic conversion of carbon monoxide to carbon dioxide of the type comprising:

a substantially cylindrical external shell;
at least one catalytic bed supported in the above mentioned shell;
an inlet nozzle in fluid communication with the shell to feed to the at least one catalytic bed a gaseous flow comprising carbon monoxide;
and characterized in that it comprises the step of:
arranging upstream of said at least one catalytic bed means for accelerating the gaseous flow.

In accordance with still another aspect of the present invention, there is also made available a method for modernization of an equipment for catalytic conversion of carbon monoxide to carbon dioxide of the type comprising:

a conversion reactor comprising a substantially cylindrical external shell and at least one catalytic bed supported in this shell;
a duct for feeding to said reactor a gaseous flow comprising carbon monoxide;
and characterized in that it comprises the step of:
arranging in the duct means for accelerating the gaseous flow.

Thanks to the above mentioned modernization methods respectively for an existing reactor or equipment, it is possible to obtain a carbon monoxide conversion process simple to implement and capable of achieving high production capacity at low operating cost and energy consumption and in which there does not occur surface packing of the catalyst contained in said at least one catalytic bed.

The characteristics and advantages of the method according to the present invention are set forth in the description of an embodiment thereof given below by way of non-limiting example with reference to the annexed drawing.

DETAILED DESCRIPTION OF A PREFERRED EMBODIMENT

Figure 1:
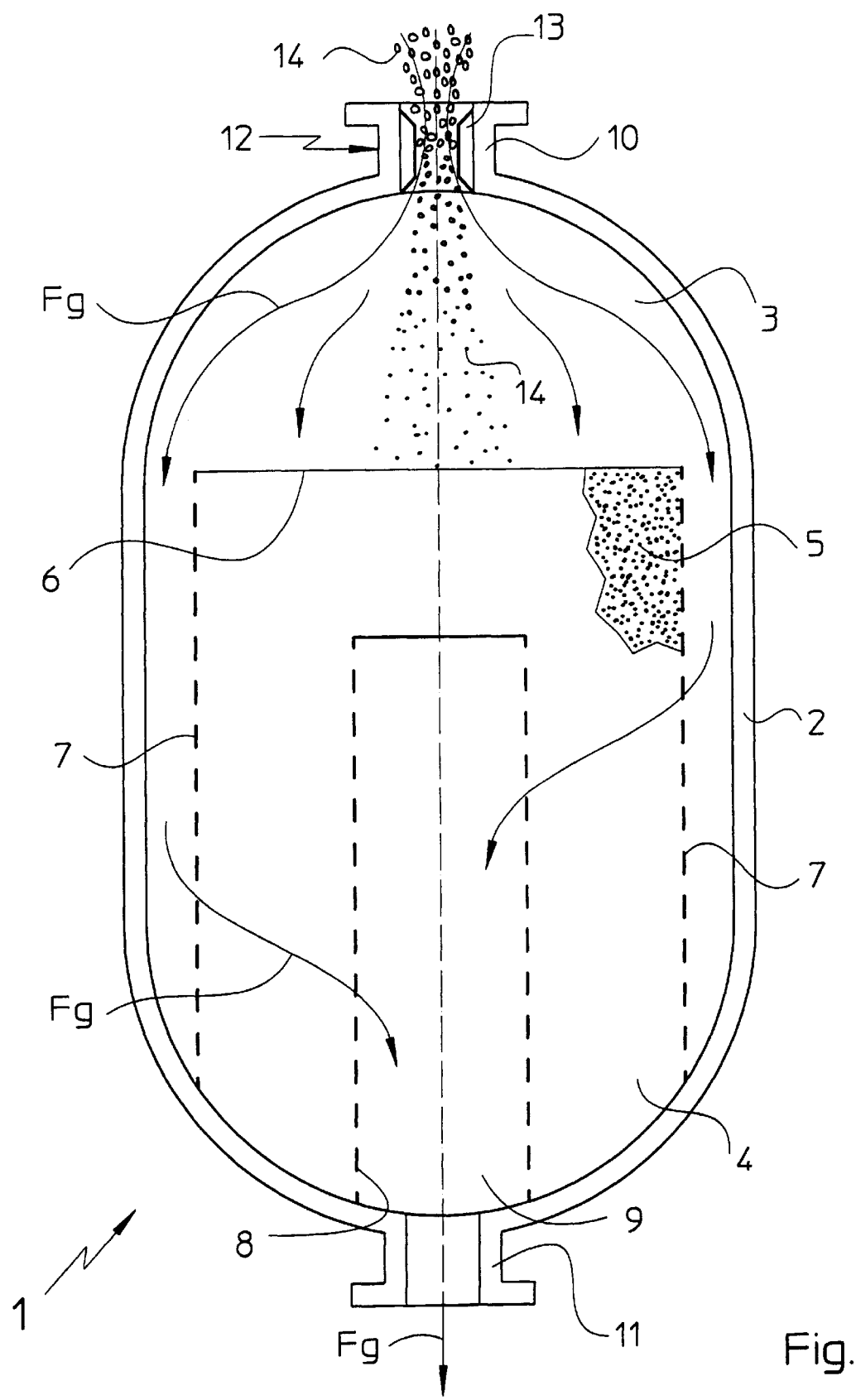
FIG. 1 shows a longitudinal cross section view of a carbon monoxide conversion reactor according to the present invention.

With reference to FIG. 1, reference number 1 indicates as a whole a reactor for high-efficiency catalytic conversion of carbon monoxide to carbon dioxide.

In general the conversion reaction takes place at temperatures between 180° C. and 500° C. and pressures between 1 bar and 100 bar.

The equipment comprises a substantially cylindrical external shell defining within it a reaction space 3 in which is supported a catalytic bed 4 for containing the catalyst 5.

In the example of FIG. 1, the catalyst 5 is all housed in a single catalytic bed 4. But it is possible to provide a reaction space 3 in which the catalyst 5 is distributed in a plurality of catalytic beds 4, for example two or three beds.

The catalytic bed 4 is of the axial-radial type with the upper end 6 and the side wall 7 gas permeable.

In the catalytic bed 4 there is also provided a gas-permeable side wall 8 in fluid communication with a manifold 9 for collection of the gas leaving the catalytic bed 4.

A catalytic bed of this type is described e.g. in EP-A-0 372 453.

To prevent undesired escape of catalyst 5, the end 6 is generally equipped with a covering grid of known type and not shown.

In accordance with an alternative embodiment of the present invention not shown, the catalytic bed 4 can be of the purely radial type with the end 6 gas impermeable.

Reference numbers 10 and 11 indicated respectively a gas inlet nozzle and a gas outlet nozzle arranged at the upper and lower ends respectively of the shell 2.

Advantageously, upstream from the catalytic bed 4 are appropriately supported means—generally indicated by reference number 12—for accelerating the gaseous flow fed into the reaction space 3.

In the example of FIG. 1, the means 12 are arranged at the gas inlet nozzle 10 and preferably near the shell 2.

This arrangement is particularly preferred because it permits obtaining means 12 easy to construct, small in size and easy to access for maintenance.

On this point, it is noted that in the shell 2 near the gas inlet nozzle 10 there is generally provided an opening (not shown) termed in the industry "manhole" for inspection and maintenance of the conversion reactor 1.

The means 12 comprise a bottleneck element 13 with a passage diameter less than the passage diameter of the gas inlet nozzle 10. venturi-type or calibrated disk-type elements can be employed as bottleneck elements 13 for example.

Especially satisfactory results were obtained with a ratio between the above mentioned passage diameters between 0.45 and 0.85.

Thanks to the acceleration means 12 it is possible to obtain splitting of the water entrained in the feed gaseous flow in small-diameter drops to facilitate at least partial evaporation of the water and in any case significantly decreasing the danger of damage to the catalyst.

In FIG. 1, the arrows Fg indicate the various paths followed in the conversion reactor 1 by the gaseous flow while reference number 14 indicates the water drops entrained in this flow.

The composition of the gaseous flow Fg fed into the reaction space 3 and comprising carbon monoxide and steam varies during the crossing of the catalytic bed 4 following the conversion reaction, so that at the outlet from the reactor 1 it comprises mainly carbon dioxide and hydrogen.

Because of the acceleration imparted to the gaseous flow Fg by the means 12, the drops 14 are concentrated in a central zone of the reaction space and strike only a small and circumscribed portion of the surface of the catalyst 5.

In addition, since the drops 14 were broken into drops of negligible size their impact with the catalytic mass does not cause any particular packing problems.

In accordance with the catalytic conversion process according to the present invention, a gaseous flow Fg comprising carbon monoxide is fed at predetermined speed into the reaction space 3 where the carbon monoxide reacts to provide a gaseous flow Fg comprising carbon dioxide.

Advantageously, according to a preliminary step of the present process the gaseous flow Fg comprising carbon monoxide is accelerated upstream of the reaction space 3.

Thus, the water drops 14 entrained in the feed gaseous flow Fg are split with resulting at least partial evaporation thereof, so as to prevent or at least substantially reduce the formation of a packed surface layer of the catalyst contained in the reaction space 3.

The operating conditions of pressure and temperature of the present process are those set forth above and correspond to the typical operating conditions of the catalytic carbon monoxide conversion processes according to the prior art.

It is advantageously found that by appropriately increasing the speed of the gaseous flow Fg, it is possible to obtain nearly total evaporation of the water drops 14. In particular this takes place when the acceleration is such as to increase the speed of the gaseous flow Fg by a factor between e.g. 4 and 5 times.

With reference to the reactor of FIG. 1, the above mentioned range of speed increase was obtained by using preferably a venturi-type bottleneck element 13, with a ratio of the passage diameter of the element 13 to the passage diameter of the gas inlet nozzle 10 between 0.45 and 0.50.

Thanks to the presence in the reaction space 3 of a catalytic bed 4 of the axial-radial type, the feed gaseous flow Fg is advantageously made to flow into the conversion reactor 1 with substantially axial-radial motion.

In this manner there is obtained the dual advantage: on the one hand of compensating the pressure drops caused by the bottleneck element 13 and on the other hand of making available a secondary and marginal area of the surface of the catalyst 5 to be sacrificed if necessary in case of packing thereof.

Indeed, the pressure drops resulting from the crossing by the gaseous flow Fg of the catalytic mass are significantly reduced with respect to a purely axial crossing of the catalytic bed, so as to be able to face without particular limitations on production capacity even high pressure drops caused by the passage of the gaseous flow Fg through the bottleneck element 13.

In addition, as shown in FIG. 1, the water drops 14 are conveyed to a minor and marginal zone of the catalytic bed 4, i.e. the central zone of the axial part of the bed 4, so as to prevent any damage to the remaining part of the catalyst 5 and consequently avoiding the formation of additional undesired pressure drops at the catalytic bed 4.

In the case of a purely radial catalytic bed the same advantages are obtained from the pressure drop viewpoint with respect to an axial-radial bed, but the utilization of the catalytic mass and hence the production capacity of the reactor are smaller for equal conditions because there is a non optimal utilization of the catalytic mass due to the lack of the axial component.

In accordance with a particularly advantageous embodiment of the present invention, the acceleration means 12 comprise a venturi element 13, which provides the desired speed increase of the feed gaseous flow Fg with a minimal pressure drop with respect to the pressure drop caused by bottleneck elements of the calibrated disc type or similar.

In accordance with an alternative implementation of the process according to the present invention there is also made available an equipment (not shown) of the type comprising:

a conversion reactor having a substantially cylindrical external shell and at least one catalytic bed supported in the shell;

a duct for feeding to the reactor a feed gaseous flow comprising carbon monoxide.

The duct has generally the function of connecting the reactor with a process boiler arranged upstream of the reactor.

By the term: "process boiler". it is intended to mean boiler for the production of steam by means of indirect heat exchange between a heating flow comprising carbon monoxide and a water flow. Generally these boilers are of the tube-nest type with the two ends of the tubes fixed to respective tube plates.

Advantageously, the equipment comprises means for acceleration of the feed gaseous flow Fg supported in the duct.

The acceleration means comprise preferably a bottleneck element having a passage diameter smaller than the passage diameter of the duct.

Preferably, the ratio between the above mentioned passage diameters is between 0.45 and 0.85 and the bottleneck element is a venturi.

As regards the catalyst packing problem, the advantages obtained by equipment of this type are comparable to those discussed above with reference to the reactor of FIG. 1.

In this case however, since the feed gaseous flow acceleration means are inside a duct, their insertion and maintenance are more difficult.

The present invention also provides respective modernization methods of a reactor and of an equipment for catalytic conversion of carbon monoxide.

Advantageously, these methods comprise the step of arranging upstream of the reaction space means for appropriate acceleration of the feed gaseous flow comprising the carbon monoxide.

In this manner it is possible to convert in a technically simple manner and with low implementation costs, existing reactors or equipment to obtain the above mentioned advantages and eliminate the drawbacks indicated with reference to the prior art.

Preferably, the acceleration means are housed in a gas inlet nozzle or in a feed duct and comprise a bottleneck element e.g. of the venturi type having a passage diameter z smaller than the passage diameter of the element containing them.

The numerous advantages achieved by the present invention are clear from the above discussion, in particular the possibility of neutralizing effectively if not totally eliminating the problem of surface packing of the catalyst contained in the reaction space by means of a conversion process easy to implement and giving high production capacity with low operating costs and energy consumption.

What is claimed is:

1. Reactor for high-efficiency catalytic conversion of carbon monoxide (CO) to carbon dioxide (CO2) comprising:

a substantially cylindrical external shell (2);

a reactor inlet nozzle (10) supported on said shell (2) to feed therein a gaseous flow comprising carbon monoxide;

at least one catalytic bed (4) supported inside said shell (2) in direct fluid communication with said nozzle (10) for receiving said gaseous flow comprising carbon monoxide entering said shell (2) through said nozzle (10);

characterized in that said reactor further comprises:

means (12) for accelerating said gaseous flow supported upstream of said at least one catalytic bed (4); and said means (12) are arranged in said nozzle (10).

2. Reactor according to claim 1 and characterized in that said means (12) comprise a bottleneck element (13) having a passage diameter smaller than the passage diameter of said nozzle (10).

3. Reactor according to claim 2, characterized in that the ratio between the passage diameter of said bottleneck element (13) and the passage diameter of said nozzle (10) is between 0.45 and 0.85.

4. Reactor according to claim 2, characterized in that said bottleneck element (13) is a venturi.

5. Reactor according to claim 1, characterized in that said at least one catalytic bed (4) is radial or axial-radial.

6. Equipment for high-efficiency catalytic conversion of carbon monoxide (CO) to carbon dioxide (CO2) comprising:

a conversion reactor comprising a substantially cylindrical external shell and at least one catalytic bed supported inside said shell;

a duct extending through said-shell for feeding to said reactor a gaseous flow comprising carbon monoxide;

characterized in that said equipment further comprises:

means for accelerating said gaseous flow supported in said duct.

7. Equipment according to claim 6, characterized in that said means comprise a bottleneck element having a passage diameter smaller than the passage diameter of said duct.

8. Equipment according to claim 7, characterized in that the ratio between the passage diameter of said bottleneck element and the passage diameter of said duct is between 0.45 and 0.85.

9. Equipment according to claim 7, characterized in that said bottleneck element is a venturi.

10. Method for modernization of a reactor for high-efficiency catalytic conversion of carbon monoxide (CO) to carbon dioxide (CO2) comprising:

a substantially cylindrical external shell (2);

a reactor inlet nozzle (10) supported on said shell (2) to feed therein a gaseous flow comprising carbon monoxide;

at least one catalytic bed (4) supported inside said shell (2) in direct fluid communication with said nozzle (10) for receiving said gaseous flow comprising carbon monoxide entering said shell (2) through said nozzle (10);

characterized in that said method further comprises the steps of:

arranging upstream of said at least one catalytic bed (4) means (12) for accelerating said gaseous flow; and said means (12) are arranged in said nozzle (10).

11. Method according to claim 10, characterized in that said means (12) comprise a bottleneck element (13) having a passage diameter smaller than the passage diameter of said nozzle (10).

12. Method according to claim 11, characterized in that said bottleneck element (13) is a venturi.

13. Method for modernization of an equipment for catalytic conversion of carbon monoxide (CO) to carbon dioxide ($CO_2$) comprising:

a conversion reactor comprising a substantially cylindrical external shell and at least one catalytic bed supported inside said shell;

a duct extending through said shell for feeding to said reactor a gaseous flow comprising carbon monoxide;

characterized in that said method comprises the step of:

arranging in said duct means for accelerating said gaseous flow.

* * * * *